US006247613B1

(12) United States Patent
Meshberg

(10) Patent No.: US 6,247,613 B1
(45) Date of Patent: Jun. 19, 2001

(54) SPRAY DISPENSING DEVICE WITH NOZZLE CLOSURE

(76) Inventor: Philip Meshberg, 2770 S. Ocean Blvd., Apt. 602, Palm Beach, FL (US) 33480

( * ) Notice: Subject to any disclaimer, the term of this patent is extended or adjusted under 35 U.S.C. 154(b) by 0 days.

(21) Appl. No.: 09/258,945

(22) Filed: Mar. 1, 1999

Related U.S. Application Data

(60) Continuation-in-part of application No. 08/774,338, filed on Dec. 30, 1996, now Pat. No. 5,875,932, which is a division of application No. 08/419,499, filed on Apr. 10, 1995, now Pat. No. 5,620,113.

(51) Int. Cl.[7] .................................................... G01F 11/00

(52) U.S. Cl. ...................... 222/1; 222/153.13; 222/321.9

(58) Field of Search ........................ 222/153.13, 153.14, 222/321.7, 321.9, 383.1

(56) References Cited

U.S. PATENT DOCUMENTS 4,506,805 * 3/1985 Marcon .......................... 222/153.13
5,158,233 * 10/1992 Foster et al. ...................... 222/321.7
5,603,434 * 2/1997 Von Schuckmann ........... 222/153.14

* cited by examiner

*Primary Examiner*—Joseph A. Kaufman
(74) *Attorney, Agent, or Firm*—Kenyon & Kenyon

(57) ABSTRACT

Nozzle closures which are mounted for pivoting movement from a closed to an open position are used with a spray dispensing device. In the open position, the nozzle closure moves away from the spray nozzle on an actuator and a spray opening in a surrounding wall, allowing fluid to dispensed through the nozzle, as the actuator is depressed. In the closed position, the nozzle closure pivots into a position where a projection enters at least partially into the spray nozzle. The projection acts to seal the spray nozzle against air, thereby preventing drying of any fluid in the nozzle and reducing the chance that the spray nozzle will become clogged. The projection also serves to provide resistance against depression of the actuator, thereby providing a locking function for the actuator to prevent accidental discharge from the spray nozzle. The sealing finger completely covers a spray opening in a wall surrounding the actuator.

18 Claims, 5 Drawing Sheets

SPRAY DISPENSING DEVICE WITH NOZZLE CLOSURE

This application is a continuation-in-part of U.S. patent application Ser. No. 08/774,338, filed Dec. 30, 1996, now U.S. Pat. No. 5,875,932, issued Mar. 2, 1999, which is a division of U.S. patent application Ser. No. 08/419,499, filed Apr. 10, 1995, now U.S. Pat. No. 5,620,113, issued Apr. 15, 1997.

BACKGROUND OF THE INVENTION

1. Field of the Invention

The present invention relates to a spray dispensing device with a closure for the spray nozzle. In particular, the present invention relates to a closure which includes structure to provide a seal for a dispensing nozzle to prevent air or contaminants from causing clogging, and which may lock the dispensing actuator when it is not in use.

2. Description of the Prior Art

U.S. Pat. No. 5,158,211 shows a mechanism for sealing the outlet nozzle of a spray actuator when the dispenser is not in use, to prevent accidental discharge of liquid. The mechanism for sealing the dispensing orifice prevents drying of the contents of the container in the spray orifice, thereby preventing clogging of the spray orifice. However, the device of U.S. Pat. No. 5,128,211 requires that the actuator be rotated to a non-dispensing position for the sealing device to seal the orifice. Furthermore, the device of that patent has a break-away tab for the dispensing position. Such a break-away tab leaves an opening in the actuator shroud which can be the repository for dirt or dust, which can interfere with operation of the actuator or nozzle.

SUMMARY OF INVENTION

The present invention includes spray dispensing devices with nozzle closures which are mounted for pivoting movement from a closed to an open position. In the open position, the nozzle closure moves away from the spray nozzle on an actuator and a spray opening in a surrounding wall, allowing fluid to dispensed through the nozzle, as the actuator is depressed. In the closed position, the nozzle closure pivots into a position where a projection enters at least partially into the spray nozzle. The projection acts to seal the spray nozzle against air, thereby preventing drying of any fluid in the nozzle and reducing the chance that the spray nozzle will become clogged. The projection also serves to provide resistance against depression of the actuator, thereby providing a locking function for the actuator to prevent accidental discharge from the spray nozzle. In addition, the nozzle closures of the present invention are designed so that the sealing finger completely covers a spray opening in a wall surrounding the actuator. By covering this opening, the nozzle closures of the present invention serve to prevent contaminants from gathering in the spray opening.

The nozzle closures of the present invention may also include additional features which lock the actuator against depression when the nozzle closure is in the closed position, thereby preventing accidental discharge. The nozzle closures additionally may include a structure which prevents the actuator from rotation away from a position where the spray nozzle is aligned with the spray opening. The nozzle closures can be provided with structures which allow locking of the nozzle closures in the open position during spraying. The nozzle closures may be mounted to the mounting cup which holds the pump and actuator-or alternatively, an integral upper portion of the container-through various mounting arrangements.

BRIEF DESCRIPTION OF THE DRAWINGS

Other objects and advantages of the invention will be apparent from the specification and claims, when considered in connection with the attached sheets of drawings, illustrating different forms of the invention, wherein like characters represent like parts and in which:

DETAILED DESCRIPTION OF THE DRAWINGS

Figure 1:
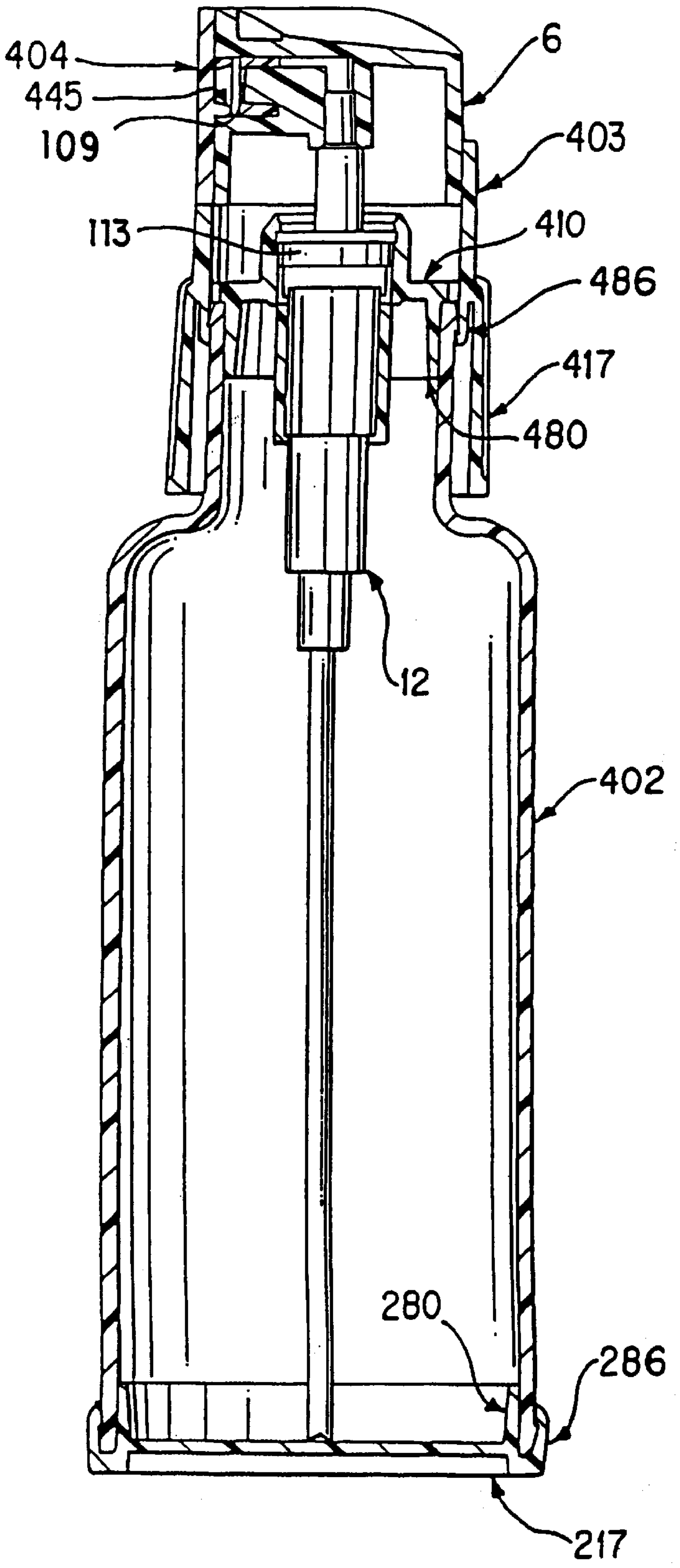
FIG. 1 is a cross-sectional view of an assembled package including a first embodiment of a nozzle closure of the present invention.

FIGS. 1–4 show a container 402 with a mounting cup 417 which includes a first embodiment of the nozzle closure of the present invention. Details of the container 402 and mounting cup are described in U.S. Pat. Nos. 5,875,932 and 5,620,113, the disclosures of which patents are incorporated herein by reference. The mounting cup 417 shown in FIGS. 1–4 is particularly effective in ensuring a leakproof and easy-to-assemble mounting of pump 12 onto container portion 402 without the need for complicated molding of container portion 402. Mounting cup 417 includes an interior piston portion 480, which slides in and seals against an interior sealing surface of container portion 402.

Container portion 402 also includes, at its upper end, an angled snap rim extending around the entire circumference of container portion 402. The snap rim includes a lower snap surface, and mounting cup 417 includes an exterior snap flange 486 which is used to secure and seal mounting cup 417 to container portion 402. The container portion 402 may include a bottom closure 217 with an inner piston portion 200 and an exterior snap flange 286.

Figure 3:
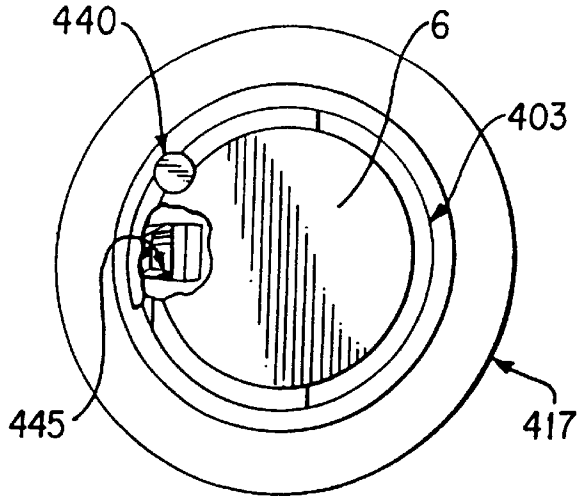
FIG. 3 is a partial cross-section of the view of FIG. 2.
Figure 2:
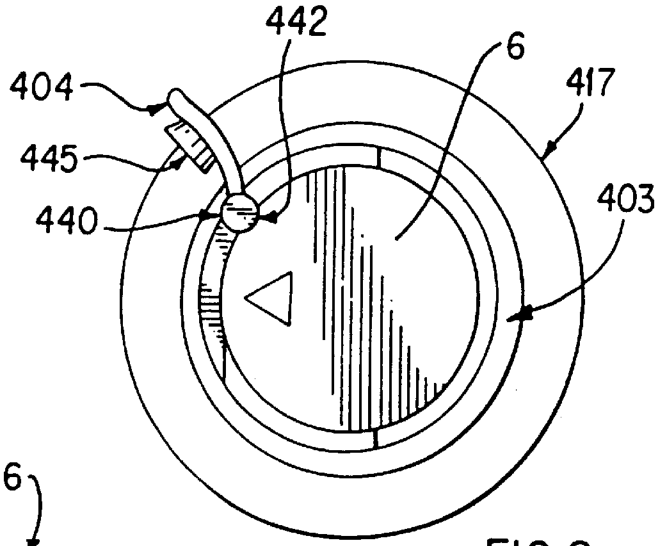
FIG. 2 is a top view of the actuator and mounting cup of the embodiment of FIG. 1.
Figure 4:
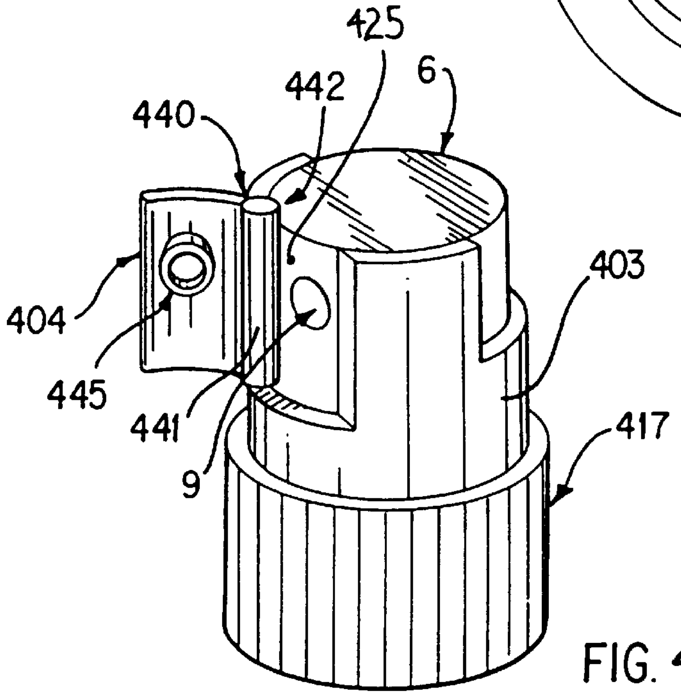
FIG. 4 is a perspective view of the actuator and mounting cup of the embodiment of FIG. 1.
Figure 5:
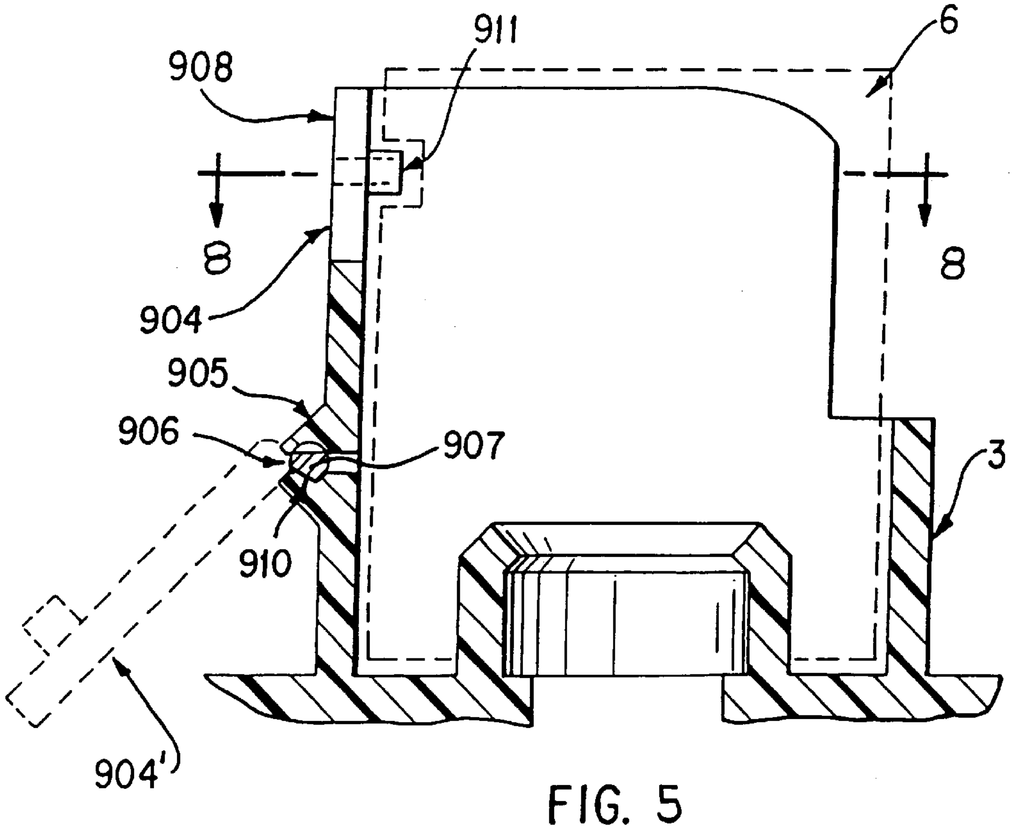
FIG. 5 is a cross-sectional view of the upper end of a container, showing two positions of a second embodiment of a nozzle closure of the present invention.
Figure 6:
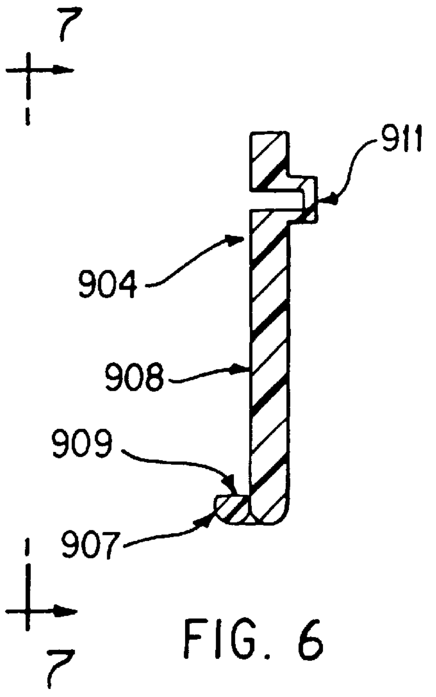
FIG. 6 is a cross-sectional view through line 6—6 of FIG. 7, of the spray nozzle closure of the embodiment of FIG. 5.
Figure 7:
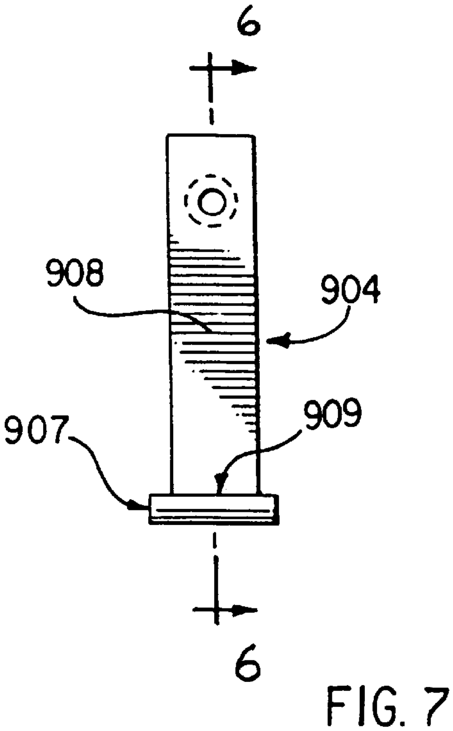
FIG. 7 is a front view of the spray nozzle closure of the embodiment of FIG. 5.
Figure 8:
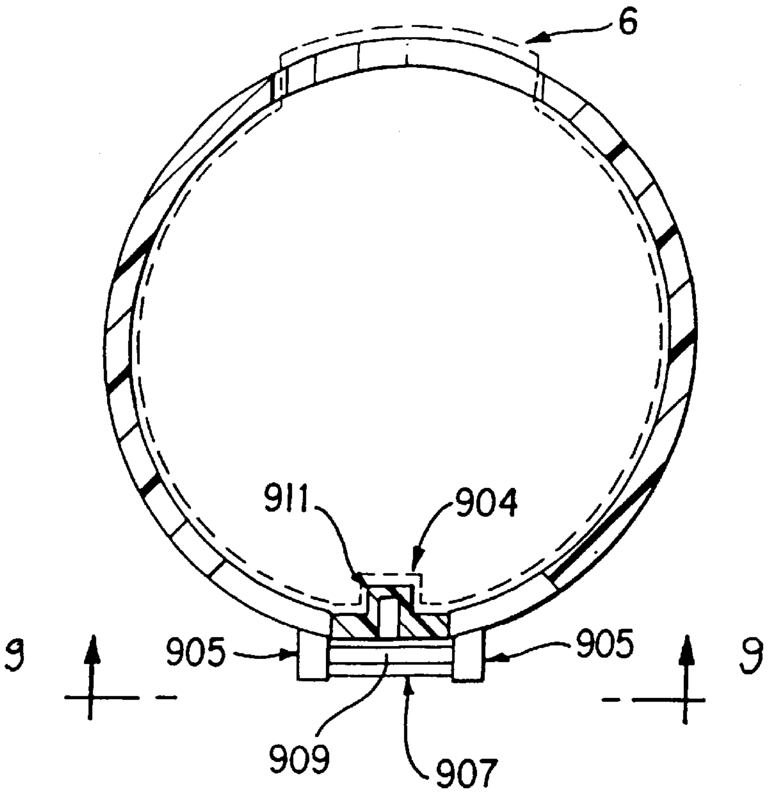
FIG. 8 is a top cross-sectional view through line 8—8 of the spray nozzle closure of the embodiment of FIG. 5.
Figure 9:
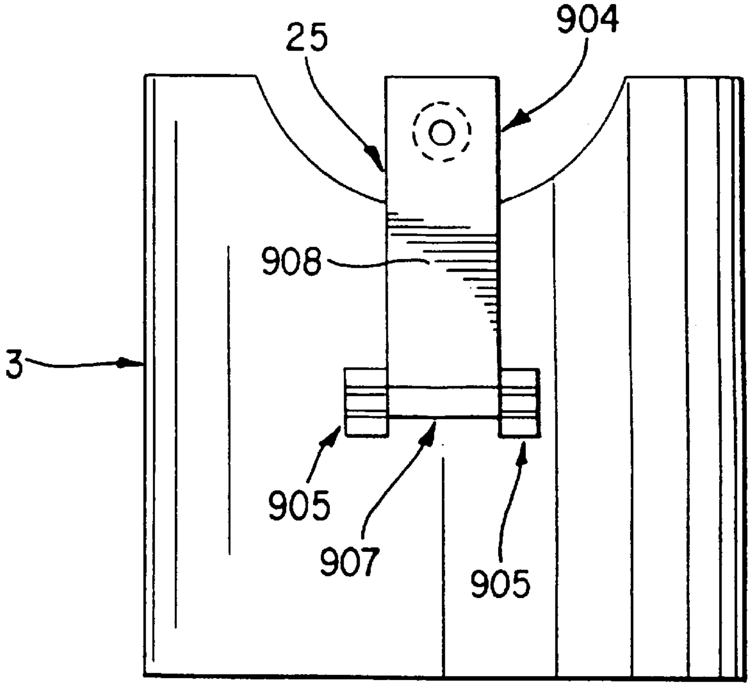
FIG. 9 is a front view of the of the upper end of a container, showing the spray nozzle closure of the embodiment of FIG. 5.

FIGS. 2–4 show the details of the spray nozzle closure for sealing the nozzle 9 on actuator 6. An upstanding wall 403 on mounting cup 417 has mounted thereon, by way of a vertical hinge 440, a sealing finger 404. Hinge 440 can be of any known type, including a molded pin on upstanding wall 403 fitting within a hole in the cylindrical portion 441 of sealing finger 404. This arrangement allows the sealing finger 404 to be detachably connected to the wall 403. Cylindrical portion 441 of sealing finger 404 fits within a semi-circular recess 442 in actuator 6. The fit between cylindrical portion 441 and recess 442 ensures that actuator 6 may not be rotated such that spray nozzle 9 is not aligned with spray opening 425 in upstanding wall 403. Sealing finger 404, when it is desired to dispense fluid, in the form of spray, from container portion 402, is pivoted away from the spray nozzle 9, to the position shown in FIGS. 2 and 4. Thereafter, the actuator is depressed, and spray exits the spray nozzle 9 through spray opening 425. After dispensing, the sealing finger 404 is pivoted towards spray nozzle 9, so that a projection in the form of an annular sealing rim 445 engages in an opening adjacent the spray nozzle 9. This engagement seals the nozzle 9 from the encroachment of air or other debris into spray nozzle 9, thereby preventing clogging of the nozzle 9 between dispensing strokes. The engagement of annular sealing rim 445 with spray nozzle 9 also acts to prevent the actuator 6 from being depressed, thereby locking the actuator 6 against accidental discharge. In the closed position, shown in FIG. 3, the sealing finger 404 completely covers spray opening 425.

FIGS. 5–9 show the features of a second embodiment of a nozzle closure with a spray orifice sealing device of the present invention. Upstanding wall portion 3 of a mounting cup or integral container has mounted thereon, on opposite sides of the spray opening 25, a bearing in the form of lugs 905. Lugs 905 have a front opening 906 through which the sealing finger 904 lower end may be inserted. Sealing finger 904 includes a hinge 907 mounted on a front surface 908 of sealing finger 904. This arrangement allows the sealing finger 904 to be detachably connected to the wall 3. Hinge 907 includes a flattened surface 909, and other than flattened surface 909, is cylindrical in shape. Lugs 905 define an opening which is cylindrical in shape, except for a flattened section 910. Hinge 907 therefore rotates in the opening in lugs 905, but snap-locks into the position shown as 904' when the flattened surface 909 interacts with flattened section 910. Sealing finger 904 includes a closure projection 911 which is shaped so as to sealingly fit within the opening surrounding the spray orifice on the actuator. Accordingly, in the position shown as 904 in FIG. 5, the closure portion 911 projects into, and seals, the opening around the spray orifice, preventing air from entering the spray orifice and drying out the liquid in the dispenser. This sealing prevents any potential clogging of the spray orifice. In the position shown as 904' in FIG. 5, the sealing finger 904 is snapped into a position away from the spray orifice, where the sealing finger 904 will not interfere with the spray from the spray orifice.

Sealing finger 904 is designed so that front surface 908 lies flush with the outer surface of upstanding wall 3. In addition, sealing finger 904 is easily inserted into lugs 905, thereby allowing easy interchangeability of sealing finger 904 onto upstanding wall 3, so that sealing fingers 904 having different colors, different closure portion 911 sizes and shapes, etc., may be placed on upstanding wall 3. Furthermore, sealing finger 904 completely fills the spray opening 25 when closure portion 911 is engaged with the spray orifice opening on the actuator so that dirt, sand, or lint does not clog spray opening 25. As with the embodiment of FIGS. 1–4, the embodiment of FIGS. 5–9 also locks the actuator 6 against accidental discharge, upon insertion of closure portion 911 into the area around the spray orifice.

Figure 10:
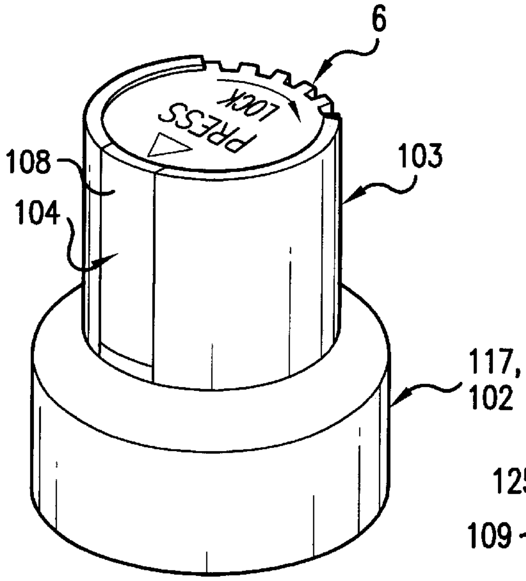
FIG. 10 is a perspective view of a third embodiment of a nozzle closure of the present invention, in a closed position.
Figure 11:
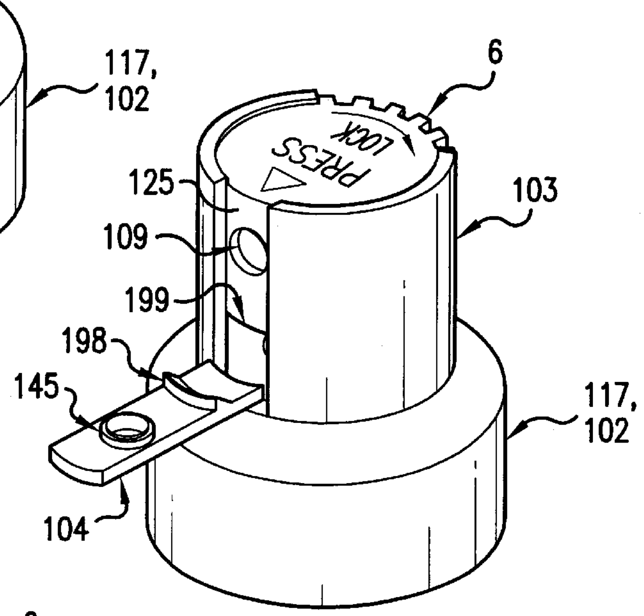
FIG. 11 is a perspective view of the embodiment of FIG. 10, in a partially opened position.
Figure 12:
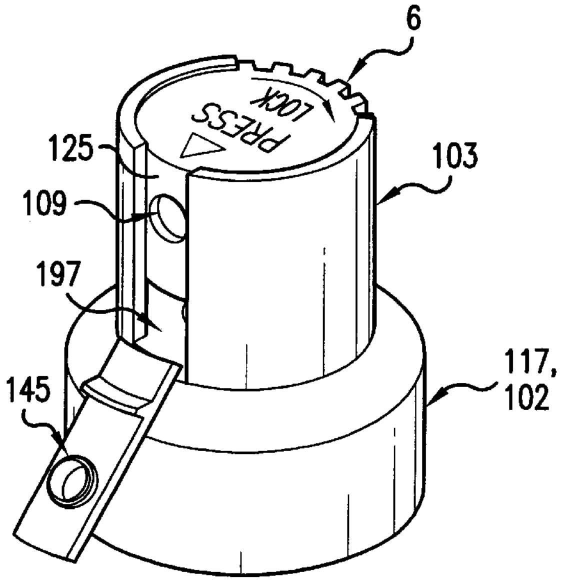
FIG. 12 is a perspective view of the embodiment of FIG. 10, in a fully opened position.
Figure 13:
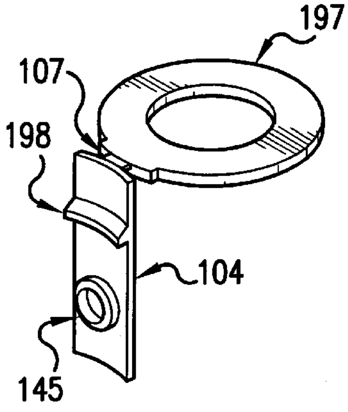
FIG. 13 is a detail perspective view of the nozzle closure of FIG. 10.

FIGS. 10–13 show the features of a third embodiment of a nozzle closure with a spray orifice sealing device of the present invention. Upstanding wall portion 103 of a mounting cup 117 or integral container 102 includes a spray opening 125. Sealing finger 104 includes a horizontal hinge 107 mounted an end of sealing finger 104. Hinge 107 may be of any suitable type, such as an integrally-molded resilient hinge 107. Hinge 107 connects sealing finger 104 to an attachment ring 197 in a pivotal manner. Hinge 107 therefore allows sealing finger 104 to rotate relative to attachment ring 197 from an open position (FIGS. 11 and 12) to a closed position (FIG. 10). Sealing finger 104 includes a projection in the form of an annular sealing rim 145 which is shaped so as to sealingly fit within the opening surrounding the spray orifice 109 on the actuator 6. Accordingly, in the position shown in FIG. 10, the annular sealing rim 145 projects into, and seals, the opening around the spray orifice 109, preventing air from entering the spray orifice 109 and drying out the liquid in the dispenser. This sealing prevents any potential clogging of the spray orifice 109. In the positions shown in FIGS. 11 and 12, the sealing finger 104 is moved to a position away from the spray orifice 109, where the sealing finger 104 will not interfere with the spray from the spray orifice and does not block the spray opening 125.

Sealing finger 104 is designed so that front surface 108 lies flush with the outer surface of upstanding wall 103. In addition, the attachment ring 197 fits into, via an interference or snap fit, the interior of upstanding wall 103, underneath the actuator 6. As a result, sealing finger 104 is easily inserted into, and removed from, the mounting cup 117 or container 102, thereby allowing easy interchangeability of sealing finger 104, so that sealing fingers 104 having different colors, different annular sealing rim 145 sizes and shapes, etc., may be placed on the mounting cup 117 or container 102. This arrangement allows the sealing finger 104 to be detachably connected to the wall 103. Furthermore, sealing finger 104 completely fills the spray opening 125 when annular sealing rim 145 is engaged with the spray orifice 109 opening on the actuator 6 so that dirt, sand, or lint does not clog spray opening 125.

The embodiment of FIGS. 10–13 also includes a feature for locking the actuator 6 against accidental discharge. Sealing finger 104 includes a locking flange 198 which fits underneath the lower edge 199 of actuator 6 when the sealing finger 104 is in the closed position (FIG. 10). The locking flange 198 in this position therefore prevents the actuator 6 from being depressed downwardly, thereby preventing accidental discharge from the spray orifice 109. In the open positions shown in FIGS. 11 and 12, the locking flange 198 moves away from the actuator 6, thereby allowing depression of the actuator 6 and spray dispensing through the spray orifice 109.

Of course, it will be recognized by those skilled in the art that a variety of variations may be made in the construction of the above invention without departing from the claims. As such, the scope of the above invention is be limited only by the claims appended hereto.

What is claimed is:

1. A spray dispensing device, comprising:

an actuator, the actuator including a spray nozzle and an opening adjacent the spray nozzle, the actuator dispensing spray through the spray nozzle when the actuator is depressed, the spray nozzle moving with the actuator when it is depressed;

a wall at least partially surrounding the actuator, the wall including a spray opening, the spray nozzle being aligned with the spray opening during dispensing whereby spray exiting the spray nozzle passes through the spray opening; and a nozzle closure, the nozzle closure including a projection, the projection fitting into the opening adjacent the spray nozzle thereby sealing the spray nozzle, the nozzle closure further including a hinge, the hinge allowing pivotal movement of the nozzle closure from a closed position, at which the projection fits into the opening in the wall adjacent the spray nozzle and the nozzle closure closes the spray opening, to an open position, where the spray opening is open to permit the spray to pass through the spray opening when the actuator is depressed.

2. The spray dispensing device of claim 1, wherein:

the hinge pivots about an axis parallel to a direction of actuation of said actuator.

3. The spray dispensing device of claim 1, wherein:

the hinge pivots about an axis perpendicular to a direction of actuation of said actuator.

4. The spray dispensing device of claim 1, wherein:

the projection is an annular sealing rim.

5. The spray dispensing device of claim 1, wherein:

the hinge includes a flattened surface, and wherein the wall includes a bearing having a flattened section, the flattened surfaces and flattened section engaging to lock the nozzle closure in the open position.

6. The spray dispensing device of claim 1, wherein:

the nozzle closure further includes a retaining element, the retaining element connecting the nozzle closure to the wall.

7. The spray dispensing device of claim 6, wherein:

the retaining element is a bearing.

8. A spray dispensing device, comprising:

an actuator, the actuator including a recess, a spray nozzle and an opening adjacent the spray nozzle, the actuator dispensing spray through the spray nozzle when the actuator is depressed;

a wall, the wall including a spray opening, the spray nozzle being aligned with the spray opening during dispensing whereby spray exiting the spray nozzle passes through the spray opening; and a nozzle closure, the nozzle closure including a projection, the projection fitting into the opening adjacent the spray nozzle thereby sealing the spray nozzle, the nozzle closure further including a hinge, the hinge allowing pivotal movement of the nozzle closure from a closed position, at which the projection fits into the opening adjacent the spray nozzle and the nozzle closure closes the spray opening, to an open position, where the spray opening is open to permit the spray to pass through the spray opening when the actuator is depressed and wherein at least a portion of the hinge fits into the recess in the actuator, thereby preventing rotation of the actuator relative to the wall.

9. A spray dispensing device, comprising:

an actuator, the actuator including a spray nozzle and an opening adjacent the spray nozzle, the actuator dispensing spray through the spray nozzle when the actuator is depressed;

a wall, the wall including a spray opening, the spray nozzle being aligned with the spray opening during dispensing whereby spray exiting the spray nozzle passes through the spray opening; and a nozzle closure, the nozzle closure including a locking flange, the locking flange engaging the actuator in the closed position of the nozzle closure to thereby lock the actuator against depression, a projection, the projection fitting into the opening adjacent the spray nozzle thereby sealing the spray nozzle, the nozzle closure further including a hinge, the hinge allowing pivotal movement of the nozzle closure from a closed position, at which the projection fits into the opening adjacent the spray nozzle and the nozzle closure closes the spray opening, to an open position, where the spray opening is open to permit the spray to pass through the spray opening when the actuator is depressed.

10. A spray dispensing device, comprising:

an actuator, the actuator including a spray nozzle and an opening adjacent the spray nozzle, the actuator dispensing spray through the spray nozzle when the actuator is depressed;

a wall, the wall including a spray opening, the spray nozzle being aligned with the spray opening during dispensing whereby spray exiting the spray nozzle passes through the spray opening; and a nozzle closure, the nozzle closure including a projection, the projection fitting into the opening adjacent the spray nozzle thereby sealing the spray nozzle, the nozzle closure further including a hinge, the hinge allowing pivotal movement of the nozzle closure from a closed position, at which the projection fits into the opening adjacent the spray nozzle and the nozzle closure closes the spray opening, to an open position, where the spray opening is open to permit the spray to pass through the spray opening when the actuator is depressed, the nozzle closure further including a retaining element, the retaining element connecting the nozzle closure to the wall wherein the retaining element is a attachment ring, the attachment ring fitting inside the wall.

11. A method of dispensing spray, comprising:

providing an actuator including a spray nozzle and an opening adjacent the spray nozzle, surrounding said actuator with a wall including a spray opening with which the spray nozzle is aligned, and a nozzle closure including a projection;

pivoting the nozzle closure away from the spray nozzle and the spray opening to an open position;

depressing the actuator to thereby dispense spray through the spray nozzle and the spray opening, the spray nozzle moving with the actuator during the depressing;

pivoting the nozzle closure toward the spray nozzle and spray opening to a closed position so that the projection fits into the opening adjacent the spray nozzle thereby sealing the spray nozzle and the nozzle closure closes the spray opening in the wall.

12. The method of claim 11, wherein said step of pivoting comprises pivoting out an axis parallel to a direction of actuation of the nozzle.

13. The method of claim 11, wherein said step of pivoting comprises pivoting about an axis perpendicular to a direction of actuation of the nozzle.

14. The method of claim 11, further comprising:

fitting at least a portion of the hinge into a recess in the actuator, thereby preventing rotation of the actuator.

15. The method of claim 11, further comprising:

engaging a flattened surface on the hinge with a flattened section in a bearing on the wall to lock the nozzle closure in the open position.

16. The method of claim 11, further comprising:

detachably connecting the nozzle closure to the wall.

17. A method of dispensing spray, comprising:

providing an actuator including a spray nozzle and an opening adjacent the spray nozzle, a wall including a spray opening with which the spray nozzle is aligned, and a nozzle closure including a projection;

pivoting the nozzle closure away from the spray nozzle and the spray opening to an open position depressing the actuator to thereby dispense spray through the spray nozzle and the spray opening;

pivoting the nozzle closure toward the spray nozzle and spray opening to a closed position so that the projection fits into the opening adjacent the spray nozzle thereby sealing the spray nozzle and the nozzle closure closes the spray opening; and engaging a locking flange on the nozzle with the actuator in the closed position of the nozzle closure to thereby lock the actuator against depression.

18. A method of dispensing spray, comprising:

providing an actuator including a spray nozzle and an opening adjacent the spray nozzle, a wall including a spray opening with which the spray nozzle is aligned, and a nozzle closure including a projection:

pivoting the nozzle closure away from the spray nozzle and the spray opening to an open position:

depressing the actuator to thereby dispense spray through the spray nozzle and the spray opening;

pivoting the nozzle closure toward the spray nozzle and spray opening to a closed position so that the projection fits into the opening adjacent the spray nozzle thereby sealing the spray nozzle and the nozzle closure closes the spray opening;

detachably connecting the nozzle closure to the wall; and connecting the nozzle closure to the wall using an attachment ring fitting inside the wall.

* * * * *

UNITED STATES PATENT AND TRADEMARK OFFICE

CERTIFICATE OF CORRECTION

PATENT NO. : 6,247,613 B1
DATED : June 19, 2001
INVENTOR(S) : Meshberg, Philip

It is certified that error appears in the above-identified patent and that said Letters Patent is hereby corrected as shown below:

<u>Column 5,</u>
Line 7, please delete "in the wall" after "opening";
Line 10, please insert -- in the wall -- after "opening".

Signed and Sealed this

Thirtieth Day of April, 2002

*Attest:*

JAMES E. ROGAN
*Director of the United States Patent and Trademark Office*

*Attesting Officer*